United States Patent
Sotokawa et al.

(10) Patent No.: US 10,087,327 B2
(45) Date of Patent: Oct. 2, 2018

(54) RESIN COMPOSITION, AND PELLET AND MOLDED PRODUCT THEREOF

(71) Applicant: Toray Industries, Inc., Tokyo (JP)

(72) Inventors: Mitsunari Sotokawa, Nagoya (JP); Hiroo Karasawa, Nagoya (JP)

(73) Assignee: Toray Industries, inc. (JP)

( * ) Notice: Subject to any disclaimer, the term of this patent is extended or adjusted under 35 U.S.C. 154(b) by 363 days.

(21) Appl. No.: 14/355,372

(22) PCT Filed: Nov. 15, 2012

(86) PCT No.: PCT/JP2012/079597
§ 371 (c)(1),
(2) Date: Apr. 30, 2014

(87) PCT Pub. No.: WO2013/077238
PCT Pub. Date: May 30, 2013

(65) Prior Publication Data
US 2014/0288229 A1    Sep. 25, 2014

(30) Foreign Application Priority Data

Nov. 25, 2011 (JP) ................................. 2011-257512
Jun. 5, 2012 (JP) ................................. 2012-127892

(51) Int. Cl.
| C08L 77/00 | (2006.01) |
| C08L 77/02 | (2006.01) |
| C08L 77/06 | (2006.01) |
| C08K 3/04 | (2006.01) |
| C08K 7/06 | (2006.01) |
| C08L 65/00 | (2006.01) |

(52) U.S. Cl.
CPC ............... *C08L 77/06* (2013.01); *C08K 7/06* (2013.01); *C08L 77/02* (2013.01); *C08G 2261/332* (2013.01); *C08L 65/00* (2013.01); *C08L 2205/02* (2013.01); *C08L 2205/03* (2013.01); *Y10T 428/2982* (2015.01)

(58) Field of Classification Search
CPC .......... C08L 77/00; C08L 77/02; C08L 77/06; C08K 3/04
USPC ....................................................... 524/495
See application file for complete search history.

(56) References Cited

U.S. PATENT DOCUMENTS

| 5,886,094 A * | 3/1999 | Sanada ................. C08L 71/123 524/275 |
| 5,895,607 A * | 4/1999 | Sugino et al. ................ 252/511 |
| 5,906,891 A * | 5/1999 | Shida ........................ D01F 6/90 264/172.18 |
| 6,291,633 B1 * | 9/2001 | Nakamura ..................... 528/310 |
| 6,828,374 B2 * | 12/2004 | Ishibashi .................. B29B 9/14 524/323 |
| 2004/0077771 A1 | 4/2004 | Wadahara et al. |
| 2005/0069662 A1* | 3/2005 | Cheng .............. B60K 15/03177 428/35.7 |
| 2007/0021558 A1* | 1/2007 | Shinohara ............ B62D 5/0409 525/66 |
| 2007/0054992 A1 | 3/2007 | Urata et al. |
| 2011/0288194 A1 | 11/2011 | Brule et al. |

FOREIGN PATENT DOCUMENTS

| CN | 1950455 | 4/2007 |
| JP | 58-120665 A | 7/1983 |
| JP | 63-137956 A | 6/1988 |
| JP | 06-200153 A | 7/1994 |
| JP | 07-109421 A | 4/1995 |
| JP | 07-138475 A | 5/1995 |
| JP | 10-138379 A | 5/1998 |
| JP | 2000-204240 A | 7/2000 |
| JP | 2001-131418 A | 5/2001 |
| JP | 2006-001965 A | 1/2006 |
| JP | 2010-202759 A | 9/2010 |
| WO | 02/062899 | 8/2002 |
| WO | 2011/010039 A1 | 1/2011 |

OTHER PUBLICATIONS

European Search Report dated Mar. 9, 2015 in corresponding European Application No. 12 851 011.2.

* cited by examiner

*Primary Examiner* — Ling Siu Choi
*Assistant Examiner* — Thuy-Al N Nguyen
(74) *Attorney, Agent, or Firm* — DLA Piper LLP (US)

(57) ABSTRACT

A resin composition includes 90 to 50% by weight of (A) a polyamide having 7 or more average carbon atoms per amide functional group and containing no aromatic ring; 10 to 50% by weight of (B) a polyamide having an aromatic ring and being crystalline, based on 100% by weight of the total of the component (A) and the component (B); and 5 to 75 parts by weight of (C) a carbon fiber, based on 100 parts by weight of the polyamide including (A) and (B).

8 Claims, No Drawings

RESIN COMPOSITION, AND PELLET AND MOLDED PRODUCT THEREOF

TECHNICAL FIELD

This disclosure provides a resin composition having excellent moldability, undergoes a decrease in rigidity and strength upon water absorption, which is a disadvantage of polyamide, to a small extent, and has excellent appearance, and a pellet and a molded product thereof.

BACKGROUND

Polyamides exhibit excellent mechanical properties upon addition of reinforcing materials represented by glass fibers, fillers such as inorganic fillers, and additives and, therefore, have hitherto been used in many fields such as automobile, electrical and electronics, and civil engineering and construction. In recent years, various carbon fiber-reinforced materials with light weight and high rigidity have been also proposed as metal substitute materials (JP 2006-001965 A). Further, a long fiber-reinforced polyamide composition comprising a polyamide and a specific reinforcing fiber roving to enhance mechanical strength at a higher temperature has also been proposed (JP 2010-202759 A).

Even the known materials above could not improve degradation of physical properties due to the water-absorbing property of polyamide and water absorption, which has been a problem for a long period of time. Further, the long fiber-reinforced polyamide composition as shown in JP '759 has been disadvantageous in that an injection-molded product therefrom has a poor appearance such as a protruding welding part, though exhibiting excellent mechanical properties as compared to common fiber-reinforced polyamides produced from a reinforcing fiber and a thermoplastic resin using a twin-screw extruder.

It could therefore be helpful to provide a resin composition having excellent moldability, undergoes a decrease in rigidity and strength upon water absorption, which is a disadvantage of polyamide, to a small extent, and has excellent appearance, a pellet thereof, and a molded product thereof.

SUMMARY

We thus provide:
A resin composition comprising 90 to 50% by weight of (A) a polyamide having 7 or more average carbon atoms per amide functional group and containing no aromatic ring; 10 to 50% by weight of (B) a polyamide having an aromatic ring and being crystalline, based on 100% by weight of the total of the component (A) and the component (B); and 5 to 75 parts by weight of (C) a carbon fiber, based on 100 parts by weight of the polyamide comprising (A) and (B).
A pellet produced from the resin composition described above, wherein the component (C) is arranged over substantially the same length as the length of the longitudinal direction of the pellet, and the pellet length is 3 to 15 mm.
A molded product produced by molding the resin composition described above or the pellet described above.
The component (A) is preferably at least one polyamide selected from the group consisting of polyamide 610, polyamide 612, polyamide 1010, polyamide 11, and polyamide 12.

The component (B) is preferably a meta-xylylene group-containing polyamide.

The resin composition preferably further comprises 2 to 15 parts by weight of a phenol polymer (D) based on 100 parts by weight of the polyamide comprising the component (A) and the component (B).

The carbon fiber in the molded product preferably has a weight average fiber length of 0.2 to 3 mm.

The molded product is preferably used in an environment in which the molded product contacts water.

Our resin compositions have excellent moldability, undergo a decrease in rigidity and strength upon water absorption, which is a disadvantage of polyamide, to a small extent, and have excellent appearance, a pellet thereof, and a molded product thereof can be obtained.

DETAILED DESCRIPTION

Our resin compositions, pellets, moldings and methods will now be described in detail.

The polyamide used as the component (A) is a polyamide having 7 or more average carbon atoms per amide functional group and containing no aromatic ring, the polyamide being essentially composed of a structural unit selected from C7 or higher lactams or amino acids and combinations of a diamine and a dicarboxylic acid, which structural unit is derived from polyamide-forming components such as substantially equimolar salts meeting the above requirement for amide functional group concentration and containing no aromatic ring.

Examples of such polyamide-forming components include amino acids such as 11-aminoundecanoic acid and 12-aminododecanoic acid; lactams such as enantholactam and ω-laur-olactam; aliphatic or alicyclic diamines such as tetramethylenediamine, hexamethylenediamine, 2-methylpentamethylenediamine, decamethylenediamine, undecamethylenediamine, dodecamethylenediamine, 2,2,4-/2,4,4-trimethylhexamethylenediamine, 5-methylnonamethylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; and aliphatic or alicyclic dicarboxylic acids such as adipic acid, suberic acid, azelaic acid, sebacic acid, and dodecanedioic acid. Among them, particularly useful polyamides are specifically, for example, polyamide 610, polyamide 612, polyamide 1010, polyamide 11, polyamide 12, and mixtures and copolymers thereof.

The polyamide used as the component (B) is a polyamide that has an aromatic ring in molecular chain and is crystalline. The polyamide having an aromatic ring in molecular chain is, for example, a polyamide essentially composed of a structural unit selected from combinations of a diamine and a dicarboxylic acid, which structural unit is derived from polyamide-forming components such as substantially equimolar salts containing an aromatic ring in one or both of the diamine and the dicarboxylic acid. Further, the crystalline polyamide is a polyamide having a heat of fusion of more than 5 J/g, as measured with a differential scanning calorimeter (DSC) under a nitrogen atmosphere at a temperature rise rate of 20° C./min.

Examples thereof include polyamide 666T (polyhexamethylene adipamide/hexamethylene terephthalamide copolymer), polyamide 6T (polyhexamethylene terephthalamide), polyamide 9T (polynonamethylene terephthalamide), polyamide 10T (polydecamethylene terephthalamide), and polyamide MXD6 (polymetaxylylene adipamide). Particularly useful are meta-xylylene group-containing polyamides, among which polyamide MXD6 can be most suitably used. These polyamides may be copolymerized with a copolymer component as long as they are crystalline, for example, to adjust their melting point.

For the best combination of polyamides, the component (A) is polyamide 610 or polyamide 612, and the component (B) is a meta-xylylene group-containing polyamide. Among the components (B), polyamide MXD6 is most preferred.

The degree of polymerization of the polyamide comprising the component (A) and the component (B) is not critical. However, to produce a thin wall molded product, high fluidity during molding is preferred, and the polyamide preferably has a sulfuric acid relative viscosity ηr of 4.0 or less. The lower limit of ηr is not particularly limited, and generally not lower than 2.0. The sulfuric acid relative viscosity ηr, as shown in JIS K 6920-2 (2000), is represented by the viscosity ratio (fall out time ratio) of a sample solution to 98% sulfuric acid determined by dissolving a sample in 98% sulfuric acid to a solution concentration of 1 g/100 ml, and then measuring a fall out speed in a thermostat bath at 25° C. using an Ostwald viscometer.

The polyamide contains 90 to 50% by weight of the component (A) and 10 to 50% by weight of the component (B), based on 100% by weight of the total of the component (A) and the component (B). When the amount of the component (A) is more than 90% by weight, decrease in rigidity upon water absorption can be significant, or the height of a welding part of a molded product can increase, resulting in poor designability. When the amount of the component (A) is less than 50% by weight, impact strength can decrease upon water absorption. The upper limit of the amount of the component (A) is more preferably 80% by weight, still more preferably 75% by weight, and the lower limit of the amount of the component (A) is more preferably 60% by weight.

The carbon fiber used as the component (C) is a carbon fiber made from PAN (polyacrylonitrile), pitch, or rayon. In addition, a metal-coated carbon fiber, which is a carbon fiber coated with a metal such as nickel or copper, can also be used.

As a useful carbon fiber, a carbon fiber with a tensile elongation at break of 1.5% or more is preferred. When the tensile elongation at break is 1.5% or more, fibers are less likely to break in a molding process, and it is easy to achieve a long fiber length in a resin composition and a molded product thereof. To provide higher mechanical properties (in particular, impact strength), the carbon fiber used is more preferably has a tensile elongation at break of 1.7% or more, still more preferably a tensile elongation at break of 1.9% or more. Although there is no upper limit on tensile elongation at break of the carbon fiber, it is generally less than 5%. The more preferred carbon fiber is a carbon fiber made from PAN with excellent balance between strength and elastic modulus. Further, such a carbon fiber may be surface-treated with silane coupling agents, aluminate coupling agents, titanate coupling agents, or the like, or may be sized with urethane resins, epoxy resins, polyester resins, styrene resins, olefin resins, amide resins, acrylic resins, phenol polymers, liquid-crystalline resins, alcohol- or water-soluble resins, or the like.

The resin composition contains the component (C) in an amount ranging from 5 to 75 parts by weight based on 100 parts by weight of the polyamide composition comprising the component (A) and the component (B). The amount of less than 5 parts by weight can lead to poor rigidity and impact strength, and the amount of more than 75 parts by weight can lead to poor thin-wall moldability as a result of decreased fluidity. The upper limit the amount of the component (C) is more preferably 60 parts by weight, still more preferably 55 parts by weight, and the lower limit of the amount of the component (C) is more preferably 10 parts by weight, and more preferably 15 parts by weight.

The resin composition preferably further contains a phenol polymer (D) because higher thin-wall moldability can be exhibited when molding the resin composition. Examples of phenol polymers include phenol novolac resin, cresol novolac resin, octylphenol, phenyl phenol, naphthol novolac resin, phenol aralkyl, naphthol aralkyl, alkyl benzene-modified phenol, cashew-modified phenol, terpene-modified phenol, and terpene phenol polymer. The amount of the phenol polymer is preferably 2 to 15 parts by weight based on 100 parts by weight of the polyamide comprising the component (A) and the component (B) in terms of mechanical properties and moldability.

Further, to the resin composition, polyamides other than the component (A) and the component (B), thermoplastic resins other than polyamide, inorganic fillers, various stabilizers such as antioxidants and UV absorbers, pigments, dyes, lubricants, plasticizers, and the like can be added depending on the intended use, to the extent that its fluidity, rigidity, impact strength, and appearance are not reduced.

The resin composition can be produced, for example, by a pultrusion method comprising drawing out a carbon fiber bundle of the component (C) continuously from a carbon fiber bundle roll of the component (C), introducing it into an impregnation die filled with the component (A) and the component (B) in a molten state, a production method comprising melt-kneading the component (A), the component (B), and the chopped component (C) in a single-screw extruder or a twin-screw extruder; and a production method comprising drawing out a carbon fiber bundle of the component (C) continuously from a carbon fiber bundle roll of the component (C), introducing it into the component (A) and the component (B) melted in a single-screw extruder or a twin-screw extruder, and performing melt-kneading. The component (A) and the component (B) may be melt-kneaded in advance in an extruder or the like.

As for the existence form of the component (D), the component (D) is preferably preliminarily impregnated into the component (C), and in such form, thin-wall moldability can be exhibited most efficiently. Most preferably, the resin composition is in the form described in JP 10-138379 A, for example, or the resin composition is produced by the production method described herein.

The resin composition is preferably in the form of a long fiber pellet. The long fiber pellet includes a pellet in which the component (C) is arranged substantially parallel to the longitudinal direction of the pellet, and the length of the component (C) in the pellet is equal to or more than the pellet length. The arrangement in the pellet is not particularly restricted, and a pellet in which a resin component comprising at least the component (A) and the component (B) is arranged such that it surrounds the carbon fiber is also preferred. Such a pellet is produced by a method in which while passing a bundle of carbon fibers of the component (C) through a coating die mounted at the end of an extruder and filled with molten resin of the component (A) and the component (B), an operation such as squeezing with a bar, repetition of spreading and bundling, or application of pressure or vibration is performed to impregnate the bundle of carbon fibers of the component (C) with the resin of the component (A) and the component (B); a method in which carbon fibers of the component (C) is passed through a coating die for bundled electric cables, whereby the carbon fibers is extrusion-coated with molten resin of the component (A) and the component (B) to produce a cable-like gut; and the like. By cutting this gut to a given length with a strand cutter, a long fiber pellet is obtained in which the carbon fiber length is substantially the same as the length of the pellet.

Although the shape of the pellet is not critical, it is preferably a cylindrical shape with a diameter of 1 to 5 mm and a pellet length of 3 to 15 mm. When the diameter is 1 mm or more, a cylindrical pellet can be readily produced. When the diameter is 5 mm or less, excellent bite into a molding machine allows stable feeding to the molding machine. Further, when the pellet length is 3 mm or more, the carbon fiber length is practically 3 mm or more, and the rigidity and impact strength can be further improved. When the pellet length is 15 mm or less, excellent bite into a molding machine allows stable feeding to the molding machine. The diameter of the pellet refers to the major axis of a cut cross-section and can be measured with a ruler. The pellet length refers to a length in a direction perpendicular to the cut cross-section and can be measured with a ruler.

The resin composition or the pellet thereof can be molded into a molded product by a method such as injection molding, extrusion molding, and compression molding. Among them, injection molding is particularly suitable because even thin wall molded products or intricately-shaped molded products such as molded products having a welding part or a hinge part and insert-molded products can be mass-produced with high dimensional accuracy.

The resin composition may be molded into a molded product by direct injection molding in which components are directly fed to a molding machine.

In the injection molding, it is more preferable to prevent excessive break of carbon fibers with attention to the following: low back pressure (preferred molding conditions); large nozzle diameter, deep screw groove, small cone angle, and low compression ratio (of injection molding machine); large sprue diameter, runner diameter, and gate diameter (of molding die); and the like. Under these conditions, the weight average fiber length of the component (C) can be kept long.

In the molded product, the weight average fiber length of the component (C) in the molded product is preferably 0.2 to 3 mm. When the weight average fiber length of the component (C) in the molded product is 0.2 mm or more, the impact strength can be further improved, and when it is 3 mm or less, the appearance of a welding part further improves, leading to excellent designability. For the weight average fiber length of the component (C) in the molded product to be 0.2 to 3 mm, for example, it is effective for the fiber length of the component (C) in the pellet used in molding to be long and, for example, it is preferable to use the above-mentioned long fiber pellet.

The weight average fiber length can be determined as follows: the molded product obtained is dissolved, for example, in a solvent that dissolves polyamide, after which the resultant is filtered, and the carbon fibers, the residue, are observed under a light microscope at 10-fold magnification to measure the length of 1,000 carbon fibers; and the measured values are divided into 11 classes calculated by Sturges' formula commonly known in statistics, and the weight average length is calculated from the central value of the classes and the frequency. If the polyamide is hardly soluble in the solvent, the polyamide may be ashed at a temperature at which the polyamide is ashed (e.g., 500° C.) using an electric furnace or the like; thereafter, the residual carbon fibers are observed under a light microscope at 10-fold magnification, and the weight average length is calculated in the same manner. The weight average fiber length $L_w$ can be calculated by the following equation wherein $L_i$ is fiber length; $\rho_i$ is density; and $N_i$ is the number of fibers with a fiber diameter $r_i$:

$$L_w = \Sigma(N_i \times \pi \times r_i^2 \times L_i^2 \times \rho_i)/\Sigma(N_i \times \pi \times r_i^2 \times L_i \rho_i).$$

When the fiber diameter and the density are constant, the weight average fiber length $L_w$ can be calculated by the following equation:

$$L_w = \Sigma(N_i \times L_i^2)/\Sigma(N_i \times L_i).$$

The molded product is useful in a wide range of fields requiring high rigidity, high impact strength, and good appearance at the same time such as electrical and electric equipment such as office automation equipment and household electrical appliances, automobile members, sports equipment, and toys. In particular, the molded product can be suitably used in applications where it is used in an environment in which it contacts water, where the characteristics of the resin composition can be utilized. For example, it is useful for housings for portable electrical and electric equipment such as notebook computers, cellular phones, digital still cameras, digital video cameras, PDAs, and portable MDs; automobile exterior parts; two-wheeled vehicle parts; climbing gear; fishing tackle; golf gear; ski/skate gear; and swimming gear.

EXAMPLES

Our resin compositions, pellets, moldings and methods will now be described in detail by way of example, but the essentials are not limited to the following examples.

Raw Materials

The raw materials used in the Examples and Comparative Examples are as described below. The polyamides used were all prepared by polymerization according to a conventional method.

Polyamide
  Polyamide 610 (sulfuric acid relative viscosity ηr (JIS K6920-2 (2000))=2.7)
  Polyamide 612 (sulfuric acid relative viscosity ηr (JIS K6920-2 (2000))=2.7)
  Polyamide MXD6 (sulfuric acid relative viscosity ηr (JIS K6920-2 (2000))=2.1, heat of fusion: 50 J/g)
  Polyamide 6 (sulfuric acid relative viscosity ηr (JIS K6920-2 (2000))=2.7)

Carbon Fiber
  Carbon fiber T700SC-12K-50C available from TORAY INDUSTRIES, INC. (diameter: 7 μm, tensile elongation: 2.1%, density: 1,800 kg/m$^3$)

Chopped Carbon Fiber
  Carbon fiber TV14-006 available from TORAY INDUSTRIES, INC. (diameter: 7 μm, fiber length: 6 mm, density: 1,800 kg/m$^3$)

Terpene Phenol Polymer
  Mighty Ace K140 manufactured by Yasuhara chemical Co., Ltd. (softening point: 140° C.)

Method of Material Assessment
  Test pieces for assessing (1) fluidity and (2) appearance were prepared by injection-molding materials into the shape described below using an injection molding machine J350EII-SP manufactured by Japan Steel Works, LTD. under the following conditions: cylinder temperature: 280° C., die:

80° C., injection time: 10 seconds, cooling: 20 seconds, injection speed: 70% of the preset maximum value of the injection molding machine, injection pressure: the lower limit of charging pressure+1.0 MPa. Using the test pieces obtained, (1) fluidity and (2) appearance were assessed by the following methods. A test piece for measuring (3) density, a test piece for assessing (4) flexural modulus, and a test piece for assessing (5) Charpy impact strength were prepared by injection-molding materials using an injection molding machine NEX1000 manufactured by Nissei Plastic Industrial Co., Ltd. in accordance with ISO1874-2 and ISO3167. Using the test pieces obtained, (3) density, (4) flexural modulus, and (5) Charpy impact strength were measured by the following methods. The test piece for measuring (3) density was subjected to bone-dry assessment in which the test pieces were stored in a sealed aluminum bag immediately after being molded, and assessed immediately after being taken out. The test piece for assessing (4) flexural modulus and the test piece for assessing (5) Charpy impact strength were subjected to bone-dry assessment in which the test pieces were stored in a sealed aluminum bag immediately after being molded, and assessed immediately after being taken out, and to wet assessment in which the test pieces were assessed after being left to stand in an environment away from direct sunlight at room temperature 23° C. and a relative humidity of 50% for 180 days.

(1) Fluidity

Using a square plate die (fan gate) of 200 mm×200 mm×1 mm, assessments were made at the lower limit of charging pressure. Although charging is the first prerequisite, a lower injection pressure provides higher fluidity, allows broader molding conditions, and provides a thin wall molded product.

(2) Appearance

The height of a welding part of a molded product produced using a welding square plate die of 80 mm×80 mm×1 mm (resin is charged from two fan gates at opposite sides) was measured with a surface roughness meter. Smaller values indicate more excellent appearance.

(3) Density

Assessments were made in accordance with ISO 1183 standard.

(4) Flexural Modulus

Assessments were made in accordance with ISO 178 standard. Larger values indicate higher rigidity, which enables a thinner wall molded product, leading to weight saving.

(5) Charpy Impact Strength

Notched Charpy impact strength was measured in accordance with ISO 179 standard. Larger values are preferred because a molded product resists breakage, for example, when it has fallen to the ground.

Example 1

Polyamide 610 and polyamide MXD6 were pre-mixed at the ratio shown in Table 1, and the mixture was sufficiently melted in a single-screw extruder of φ 50 mm at 260° C. and extruded into a crosshead die mounted at the end of the extruder. At the same time, a carbon fiber was continuously fed into the crosshead die to thereby obtain a strand in which reinforcing fibers were coated with polyamide. The carbon fiber ratio was controlled by controlling the extrusion rate of the polyamide to be 43 parts by weight based on 100 parts by weight of the mixed polyamide. The strand was cooled and then cut with a cutter to a length of 7 mm to obtain a pellet. The major axis of the cross-section of the pellet was measured with a ruler to be 3.4 mm. The pellet obtained was dried in vacuum at 80° C. for 5 hours or more, and then assessed by the methods described above. The assessment results are shown in Table 1.

Examples 2 to 7, Comparative Examples 1 to 6

While taking up the carbon fibers at a constant speed, terpene phenol polymer was continuously applied to the carbon fibers at the ratio shown in Table 1 on a roll heated to 130° C. Further, in an atmosphere heated to 180° C., the carbon fibers were passed alternately over and under eight rolls with a diameter of 50 mm aligned in line which freely rotated with the aid of bearings. Through this operation, the terpene phenol polymer was impregnated into the fiber bundle of the carbon fibers.

Thereafter, a polyamide pre-mixed at the ratio shown in Table 1 (a single polyamide was used as it was) was sufficiently melted in a single-screw extruder and extruded into a crosshead die mounted at the end of the extruder. At the same time, continuous carbon fibers impregnated with the polymer described above were also continuously fed into the crosshead die to thereby obtain a strand in which carbon fibers impregnated with polymer were coated with polyamide. The carbon fiber ratio was controlled by controlling the extrusion rate of the polyamide to be as shown in Table 1. The strand was cooled and then cut with a cutter to a length of 7 mm to obtain a pellet. The major axis of the cross-section of the pellet was measured with a ruler to be 3.4 mm. The pellet obtained was dried in vacuum at 80° C. for 5 hours or more, and then assessed by the methods described above. The assessment results are shown in Table 1.

TABLE 1

| | | Example 1 | Example 2 | Example 3 | Example 4 | Example 5 | Example 6 | Example 7 |
|---|---|---|---|---|---|---|---|---|
| Polyamide 610 | Parts by weight | 65 | 65 | 85 | 65 | 55 | 65 | 0 |
| Polyamide 612 | Parts by weight | 0 | 0 | 0 | 0 | 0 | 0 | 65 |
| Polyamide MXD6 | Parts by weight | 35 | 35 | 15 | 35 | 45 | 35 | 35 |
| Polyamide 6 | Parts by weight | 0 | 0 | 0 | 0 | 0 | 0 | 0 |
| Carbon fiber | Parts by weight | 43 | 11 | 47 | 47 | 47 | 60 | 47 |
| Terpene phenol resin | Parts by weight | 0 | 2 | 9 | 9 | 9 | 12 | 9 |
| Fluidity Lower limit of charging pressure | MPa | 115 | 82 | 102 | 98 | 100 | 120 | 99 |

TABLE 1-continued

|  |  | Ex. 1 | Ex. 2 | Ex. 3 | Ex. 4 | Ex. 5 | Ex. 6 | Ex. 7 |
|---|---|---|---|---|---|---|---|---|
| Appearance Hight of welding part | μm | 2 | 1 | 2 | 2 | 2 | 3 | 2 |
| Density (Bone-dry assesment) | kg/m³ | 1,260 | 1,160 | 1,240 | 1,260 | 1,270 | 1,280 | 1,250 |
| Flexural modulus | GPa | 21 | 10 | 21 | 21 | 21 | 25 | 21 |
| Charpy impact strengh (Wet assesment) | kJ/m² | 16 | 9 | 18 | 17 | 17 | 18 | 17 |
| Flexural modulus | GPa | 21 | 10 | 20 | 21 | 21 | 25 | 21 |
| Charpy impact strengh | kJ/m² | 16 | 9 | 18 | 18 | 17 | 18 | 18 |

|  |  | Comparative Example 1 | Comparative Example 2 | Comparative Example 3 | Comparative Example 4 | Comparative Example 5 | Comparative Example 6 |
|---|---|---|---|---|---|---|---|
| Polyamide 610 | Parts by weight | 100 | 0 | 0 | 0 | 65 | 30 |
| Polyamide 612 | Parts by weight | 0 | 0 | 0 | 0 | 0 | 0 |
| Polyamide MXD6 | Parts by weight | 0 | 100 | 0 | 35 | 35 | 70 |
| Polyamide 6 | Parts by weight | 0 | 0 | 100 | 65 | 0 | 0 |
| Carbon fiber | Parts by weight | 47 | 47 | 47 | 47 | 3 | 47 |
| Terpene phenol resin | Parts by weight | 9 | 9 | 9 | 9 | 1 | 9 |
| Fluidity Lower limit of charging pressure | MPa | 105 | 98 | 97 | 98 | 71 | 95 |
| Appearance Hight of welding part | μm | 4 | 2 | 5 | 5 | 2 | 3 |
| Density (Bone-dry assesment) | kg/m³ | 1,220 | 1,330 | 1,270 | 1,280 | 1,130 | 1,290 |
| Flexural modulus | GPa | 20 | 22 | 21 | 21 | 5 | 22 |
| Charpy impact strengh (Wet assesment) | kJ/m² | 19 | 18 | 19 | 18 | 6 | 17 |
| Flexural modulus | GPa | 18 | 21 | 16 | 18 | 4 | 21 |
| Charpy impact strengh | kJ/m² | 19 | 14 | 20 | 15 | 7 | 15 |

The materials in Examples 1 to 7 all could be molded into a square plate of 200 mm×200 mm×1 mm, but comparison of Example 1 and Example 4 shows that the material containing terpene phenol polymer showed higher fluidity. Further, all the materials showed a low welding height, excellent appearance, and, further, a high bone-dry flexural modulus and Charpy impact strength. A decrease in physical property values was not observed even upon water absorption, and high values were obtained.

The test piece for assessing Charpy impact strength prepared in Example 4 was placed in an electric furnace at 500° C. After the resin component was sufficiently ashed, the test piece was observed under a microscope, and the fiber length of randomly selected 1,000 carbon fibers was measured. On the precondition that the fiber diameter and the density were constant, the weight average fiber length was calculated by the following equation to be 1.5 mm:

$$L_w = \Sigma(N_i \times L_i^2) / \Sigma(N_i \times L_i)$$

wherein $L_w$: weight average fiber length, $L_i$: fiber length, and $N_i$: the number of fibers having a fiber length $L_i$.

On the other hand, in Comparative Example 1, the welding height was high, and the flexural modulus decreased upon water absorption. In Comparative Example 2, the Charpy impact strength decreased upon water absorption. Further, in Comparative Example 6, the welding height was high, and both the flexural modulus and the Charpy impact strength decreased upon water absorption. We found that the effects were exerted when the ratio of the component (A) to the component (B) and the amount of the component (C), the components being constituents, were in a specific range.

In Comparative Example 4, the welding height was high, and the flexural modulus and the Charpy impact strength decreased upon water absorption, showing that a specific combination of polyamides produced the effects.

Examples 8 to 11, Comparative Examples 7 to 12

Using a twin-screw extruder TEX-44αII manufactured by Japan Steel Works, LTD., polyamides were fed through a main feeder at the ratio shown in Table 2, and chopped carbon fibers were fed through a side feeder. They were melt-kneaded at a resin temperature of 290° C., cooled in a water bath, and cut with a cutter to a length of 3 mm to obtain a pellet with a diameter of 3.0 mm. The pressure was reduced via a vent port provided in the middle of the extruder to remove water.

The pellet obtained was dried in vacuum at 80° C. for 5 hours or more, and then assessed by the methods described above. The assessment results are shown in Table 2. The pellet obtained in Example 9 was placed in an electric furnace at 500° C. After the resin component was sufficiently ashed, the test piece was observed under a microscope, and the fiber length of randomly selected 1,000 carbon fibers was measured. On the precondition that the fiber diameter and the density were constant, the weight average fiber length was calculated to be 0.3 mm.

TABLE 2

|  |  | Example 8 | Example 9 | Example 10 | Example 11 | Comparative Example 7 | Comparative Example 8 | Comparative Example 9 | Comparative Example 10 | Comparative Example 11 | Comparative Example 12 |
|---|---|---|---|---|---|---|---|---|---|---|---|
| Polyamide 610 | Parts by weight | 65 | 65 | 55 | 65 | 100 | 0 | 0 | 0 | 65 | 65 |
| Polyamide MXD6 | Parts by weight | 35 | 35 | 45 | 35 | 0 | 100 | 0 | 65 | 35 | 35 |
| Polyamide 6 | Parts by weight | 0 | 0 | 0 | 0 | 0 | 0 | 100 | 35 | 0 | 0 |
| Carbon fiber | Parts by weight | 11 | 43 | 43 | 67 | 43 | 43 | 43 | 43 | 3 | 100 |
| Fluidity Lower limit of charging pressure | MPa | 73 | 89 | 85 | 115 | 92 | 84 | 84 | 87 | 68 | full charge impossible |
| Appearance Hight of welding part | μm | 1 | 1 | 1 | 2 | 2 | 1 | 2 | 1 | 1 | 3 |
| Density (Bone-dry assesment) | kg/m$^3$ | 1,160 | 1,260 | 1,270 | 1,310 | 1,220 | 1,330 | 1,260 | 1,310 | 1,190 | 1,400 |
| Flexural modulus | GPa | 11 | 22 | 22 | 30 | 20 | 23 | 20 | 22 | 5 | 33 |
| Charpy impact strength (Wet assesment) | kJ/m$^2$ | 9 | 11 | 11 | 10 | 13 | 6 | 10 | 8 | 6 | 9 |
| Flexural modulus | GPa | 10 | 20 | 21 | 29 | 16 | 23 | 12 | 15 | 4 | 31 |
| Charpy impact strength | kJ/m$^2$ | 9 | 11 | 10 | 10 | 13 | 5 | 11 | 8 | 8 | 8 |

All the materials in Examples 8 to 11 showed a low welding height and excellent appearance, and the flexural modulus and Charpy impact strength substantially equivalent to those when bone-dry were maintained even when water was absorbed. Using the pellet obtained in Example 9, the weight average fiber length of carbon fibers in the molded product was calculated in the same manner as in Example 4 to be 0.2 mm.

On the other hand, in Comparative Examples 7, 9, and 10, the flexural modulus decreased upon water absorption, and in Comparative Example 8, the Charpy impact strength was poor. Further, in Comparative Example 11, the flexural modulus and the Charpy impact strength were poor, and in Comparative Example 12, a square plate of 200 mm×200 mm×1 mm could not be molded, showing poor fluidity. We found that the effects were exerted when the ratio of the component (A) to the component (B) and the amount of the component (C), the components being constituents, were in a specific range.

As shown in Examples above, resin compositions containing specific polyamides at a specific ratio and containing a specific amount of carbon fibers had both excellent appearance and high rigidity and impact strength when bone-dry and upon water absorption.

INDUSTRIAL APPLICABILITY

The polyamide composition is useful in a wide range of fields such as electrical and electric equipment such as office automation equipment and household electrical appliances, automobile members, sports equipment, and toys. In particular, the polyamide composition can be suitably used in applications where it is used in an environment in which contacts with water, where the characteristics of the resin composition can be utilized.

The invention claimed is:

1. A resin composition, comprising:
   90 to 50% by weight of (A) a polyamide having 7 or more average carbon atoms per amide functional group and containing no aromatic ring;
   10 to 50% by weight of (B) a polyamide having an aromatic ring and being crystalline, based on 100% by weight of the total of the component (A) and the component (B);
   43 to 75 parts by weight of (C) a carbon fiber, based on 100 parts by weight of the polyamide comprising (A) and (B); and
   wherein the component (A) is at least one polyamide selected from the group consisting of polyamide 610, polyamide 612, polyamide 1010, polyamide 11, and polyamide 12, and
   the component (B) is a meta-xylylene group-containing polyamide,
   wherein flexural modulus of molded product upon water absorption is 20 GPa or more.

2. A pellet produced from the resin composition according to claim 1, wherein the component (C) is arranged over substantially the same length as a length of a longitudinal direction of the pellet, and pellet length is 3 to 15 mm.

3. A molded product produced by molding the pellet according to claim 2.

4. The molded product according to claim 3, wherein the carbon fiber in the molded product has a weight average fiber length of 0.2 to 3 mm.

5. The molded product according to claim 3, wherein the molded product is used in an environment in which the molded product contacts water.

6. The resin composition according to claim 1, further comprising 2 to 15 parts by weight of a phenol polymer (D) based on 100 parts by weight of the polyamide comprising the component (A) and the component (B).

7. The resin composition according to claim 6, wherein the phenol polymer (D) is terpene phenol polymer.

8. The resin composition according to claim 1, wherein component (A) is polyamide 610 or polyamide 612.

* * * * *